United States Patent [19]

Clasen et al.

[11] Patent Number: 4,816,051
[45] Date of Patent: Mar. 28, 1989

[54] METHOD OF MANUFACTURING GLASS BODIES BY MEANS OF EXTRUSION

[75] Inventors: Rolf Clasen, Aachen; Benno Schmidl, Simmerath-Lammersdorf, both of Fed. Rep. of Germany

[73] Assignee: U.S. Philips Corp., New York, N.Y.

[21] Appl. No.: 109,792

[22] Filed: Oct. 16, 1987

[30] Foreign Application Priority Data

Oct. 22, 1986 [DE] Fed. Rep. of Germany ....... 3635847

[51] Int. Cl.⁴ ............................................ C03B 37/016
[52] U.S. Cl. ......................................... 65/17; 65/3.11; 65/18.1; 156/DIG. 108; 264/60; 264/63
[58] Field of Search .................... 65/2,3.11, 3.12, 17, 65/18.1, 900, 901; 156/DIG. 108; 264/60, 63

[56] References Cited

U.S. PATENT DOCUMENTS

| | | | |
|---|---|---|---|
| 4,680,047 | 7/1987 | Clasen et al. | 65/17 |
| 4,682,995 | 7/1987 | Clasen | 65/18.1 |
| 4,684,385 | 8/1987 | Clasen | 65/17 |
| 4,685,946 | 8/1987 | Derks et al. | 65/17 |

*Primary Examiner*—Robert L. Lindsay
*Attorney, Agent, or Firm*—Ernestine C. Bartlett

[57] ABSTRACT

A method of manufacturing glass bodies, in which the starting material for the glass body, being an extrusion mass consisting of microdispersed $SiO_2$ particles, a binder and a dispersing liquid, is used to form a porous green body by extrusion, which is subsequently dried, purified and sintered, the extrusion mass, which is shaped by the nozzle of an extruder, being extruded into a transfer vessel in which the extruded body is tempered towards the gelification point of the binder present in the extrusion mass, a liquid being contained in the transfer vessel, which cannot or substantially not be mixed with the dispersing liquid present in the extrusion mass, and which cannot be mixed with the binder present in the extrusion mass; and an arrangement for carrying out this method.

19 Claims, 1 Drawing Sheet

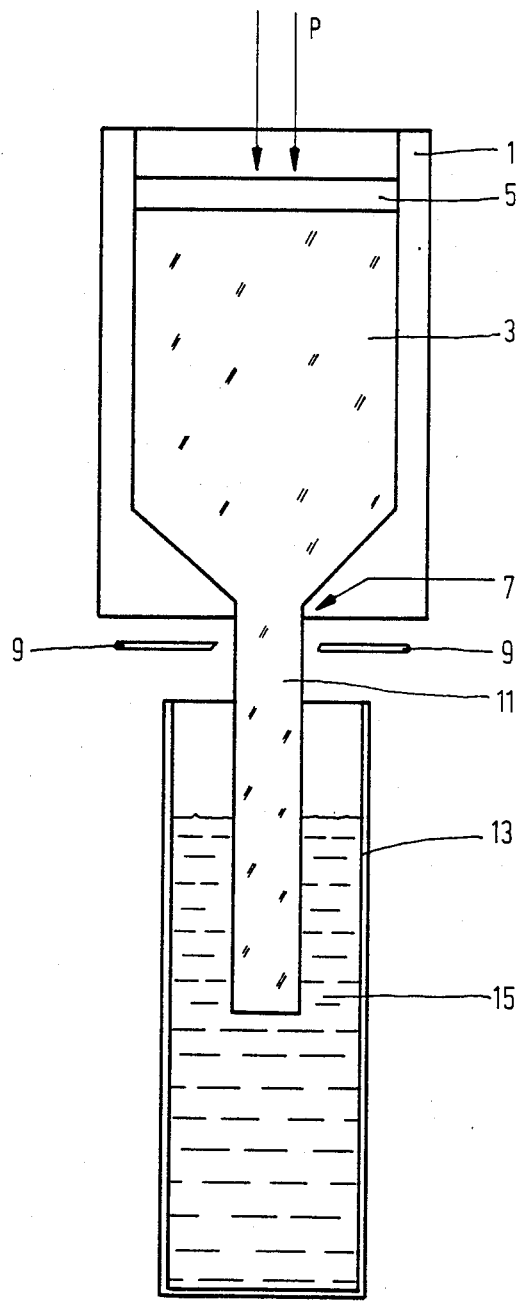

METHOD OF MANUFACTURING GLASS BODIES BY MEANS OF EXTRUSION

FIELD OF THE INVENTION

The invention relates to a method of manufacturing glass bodies, in which the starting material for the glass body, being an extrusion mass consisting of microdispersed $SiO_2$ particles, a binder and a dispersing liquid, is used to form a porous green body by extrusion, which is subsequently dried, purified and sintered.

The invention further relates to an arrangement for carrying out such a method as well as to the use of the glass bodies manufactured according to the inventive method.

The method mentioned in the opening paragraph is particularly suitable for the manufacture of preforms for optical waveguides of quartz glass.

BACKGROUND OF THE INVENTION

Optical waveguides have a wide range of application; they are used, for example, in light-transmission arrangements or light-transmission systems such as optical communication systems, and they are predominantly made of a type of glass which has a high silicon-dioxide content (which, if required, contains a dopant for adjusting the refractive index of the glass).

Types of glass which can suitably be used for the manufacture of optical waveguides can also advantageously be used for the manufacture of lamp envelopes for halogen lamps or gas-discharge lamps, because these types of glass, like the ones used for optical waveguides, must be substantially anhydrous and exhibit a high silicon-dioxide content.

GB No. 10 10 702 describes a method in which powdered, pure or substantially pure $SiO_2$ to which a liquid binder is added in a quantity from 1 to 50% by weight of the $SiO_2$ content, and to which optionally a further lubricant which facilitates the extrusion process may be added in a quantity from 0.1 to 10% by weight of the $SiO_2$ content, are worked into an extrusion mass which is subsequently deformed in an extrusion process. For example, organic fluids such as polyvinyl alcohol or methyl cellulose may be used as liquid binders.

This method corresponds to methods used in the art of ceramics, in which ground, powdered starting materials having grain diameters $>1$ $\mu m$, with water as a dispersing liquid, with binders and optionally with lubricants are worked into very viscous extrudable masses.

In processing microdispersed starting powders having grain diameters $<1$ $\mu m$ (which cannot be formed in conventional grinding porcesses), as they are used for the manufacture of quartz glass bodies, in particular for preforms of optical waveguides, problems will arise with the mixing or kneading, particularly, when the starting materials have a high solid content, because in this case a considerably larger quantity of particles must be uniformly distributed, and a considerably larger surface must be uniformly covered with the additives (binders and optionally lubricants). For example, the typical mixing and kneading times for a starting material of microdispersed $SiO_2$ particles (10–100 nm diameter) having 60% by weight of $SiO_2$ and 36% by weight of water (the rest are additives) are approximately from one to three hours.

Besides the fact that homogenization of very viscous suspensions (extrusion masses) of the latter type is very time-consuming, there are other problems: In the case of unsatisfactorily stabilized suspensions a segregation tendency will readily develop which leads to extrusion problems. This can be accredited to the substantially enlarged surface of the solid particles in such suspensions, to the growing number of solid-liquid interfaces as the particles become smaller, and to the conditions of linkage (the van der Waal's forces being of growing importance and colloid-chemical aspects manifesting themselves). Minor, local variations in the green body density and, hence, in the pore density readily lead to the formation of cracks during drying and to deformations during sintering. The latter occurs in particular when molded glass bodies are sintered via viscous flow. For example when the extruded bodies are fed in another direction, as is customary for the continuous production of small-diameter bodies in ceramics technology, this has a tendency to affect the homogeneity of the pore structure, ultimately manifesting itself in deformations of the moulded body after the sintering process.

SUMMARY OF THE INVENTION

It is an object of the invention to provide a method of and an arrangement for extruding masses having microdispersed $SiO_2$ particles with a grain size in the range from 10 to 500 nm as a solid, under conditions which substantially obviate the action of external forces on the already shaped, still moist green body.

This object is achieved according to the invention, in that the extrusion mass, which is shaped by the nozzle of an extruder, is extruded into a transfer vessel in which the extruded green body is tempered towards the gelification point of the binder present in the extrusion mass, a liquid being contained in the transfer vessel, which cannot or substantially cannot be mixed with the dispersing liquid present in the extrusion mass, and which cannot be mixed with the binder present in the extrusion mass. For ease of discussion, this inability to mix with the extrusion mass binder and/or with the dispersing liquid will be referred to herein as immiscibility.

An arrangement for carrying out this method is characterized by an extruder comprising a receptacle for holding the extrusion mass, a die by means of which the extrusion mass can be forced towards an exit nozzle, knives being arranged underneath this nozzle, by means of which an extruded green body can be cut off when it has obtained the desired length, and comprising a liquid-containing temperable transfer vessel for holding the extruded green body, which vessel is arranged underneath the nozzle.

By tempering the extruded green body towards the gelatification point of the binder contained in the extrusion mass, the extruded green body solidifies before it is subjected to a drying process; in this way a change in the pore structure of the still moist green body in counteracted.

According to an advantageous embodiment of the inventive method, the liquid contained in the transfer vessel is of about the same density as the extruded still moist green body. In this way, the temperature causing the gelatification of the binder contained in the extrusion mass is quickly and directly transferred to the extruded green body, without drying out of the latter and more in particular without damaging its surface. A further advantage of first introducing the extruded green body into a liquid is that external forces acting on the green body, and which may, for example, in the manufacture of long and heavy green bodies lead to a defective pore structure, or to the formation of cracks or even to breakage of the green body are compensated.

According to advantageous further embodiments of the invention, methyl cellulose or polyvinyl alcohol is used as a binder for the extrusion mass. When methyl cellulose is used as a binder gelatification of the binder can be made to take place at temperatures over room temperature, i.e. by heating the transfer vessel and the liquid contained therein. When heating is to be avoided, gelatification of the binder can also be obtained by cooling the transfer vessel and the liquid contained therein to a temperature below room temperature; for example, by using polyvinyl alcohol as a binder. As a result of the gelled binders, green bodies having a relatively high density are obtained because the gelatification takes place at the contact areas of the solid particles in the extrusion mass, thereby forming a bridging layer.

A particular advantage of the method according to the invention, in which use is made of the inventive arrangement, is that from very viscous suspensions having a solids content of relatively small, microdispersed $SiO_2$ particles molded bodies with a relatively large diameter and a relatively great length (for example, also relatively thin-walled tubes in the said ratio of dimensions) can be made by extrusion without impairing the desired geometry and pore structure of the extruded green body over its entire length. Subsequently, the extruded green bodies can be dried, purified and sintered without forming cracks or deformations.

On the one hand these green bodies are so firm that they can be handled without difficulty and they exhibit a suitable density (from 35 to 50% of the density of compact quartz glass) for the subsequent sintering process, while on the other hand, they are porous and hence gas permeable, such that in the purification step following the drying process they can be efficiently purified in a heated gaseous phase which reacts with the impurities present.

A further advantage is that very homogeneous green bodies can be obtained. This is not only important for the formation of a glass body which is free from bubbles and reams but also for the drying of the green body. Drying cracks are particularly frequent at the location of inhomogeneities in the green body. However, drying cracks can also develop because the linkage force between the solid particles is insufficient, i.e. when the surface of the solid particles is not sufficiently uniformly coated with additives enhancing cross-linking reactions or when the cross-linking was incomplete. This is problematic in very viscous systems having large surfaces; in particular for these systems the method of the present invention provides a very important improvement in that it optimizes the solidification of the still moist green body.

BRIEF DESCRIPTION OF THE DRAWING

The invention will now be explained in more detail, and a description is given of exemplary embodiments with reference to the accompanying drawing.

FIG. 1 shows a sectional view of an operational extruder according to the invention.

DETAILED DESCRIPTION OF THE PREFERRED EMBODIMENTS

An extruder having a receptacle 1 contains an extrusion mass 3 which is to be compressed and which is in the form of a very viscous suspension which is extruded, by a die 5 through an exit nozzle 7, in the form of a green body (extrusion) 11 into a transfer vessel 13 which is arranged underneath the nozzle 7, which vessel contains a liquid 15 which is kept at a desired temperature and which is immiscible or substantially immiscible with the dispersing liquid present in the extrusion mass 3, and which is immiscible or substantially immiscible with the binder present in the extrusion mass 3. The liquid 15 suitably has a density which corresponds to that of the extruded green body 11. The temperature of the transfer vessel 13 containing the liquid 15 is set at a value at which gelatification of the binder in the extrusion mass 3 takes place. When the extruded green body 11 has reached the desired length it is cut off below the nozzle 7 by knives 9, after which the transfer vessel 13 holding the liquid 15 in which the green body 11 is immersed is transferred to a drying station; before the green body 11 is dried it is left in the liquid 15 until the binder has gelled.

The invention is used in the following examples of embodiments:

EXAMPLE I

A homogenized extrusion mass 3 consisting of 63% by weight of microdispersed $SiO_2$ particles having an average grain diameter of 40 nm, 4.2% by weight of a binder, in this case polyvinyl alcohol, and 32.8% by weight of water as a dispersing liquid is extruded into the liquid 15 contained in the transfer vessel 13 at a rate of 1.50 m/min. and a pressure of 160 bar. In this example the extruded green body is a tube having an outside diameter of 30 nm and a wall thickness of 5 mm. The liquid 15 is nitrobenzene having a density of 1.19 g/cm$^3$ and a temperature of 8° C. The green body 11 issuing from the nozzle 7 is cut off at a length of 1 m and remains for about ½ hour in the transfer vessel 13 which is transferred to the drying station. Green bodies produced according to this example had a density of approximately 1.7 g/cm$^3$. After the gelatification process of the binder has been concluded, the green body is dried in still air in a suspended manner for 5 hours, after which it is heated in a drying compartment having a heating rate of 20° C. per hour to a temperature of 120° C. to remove any residual water from the green body. The dried green body is then heated to a temperature of 800° C. in 100 min., and in order to remove impurities it is subjected to a $SoCl_2$-saturated $O_2$-gas flow for 1.5 h. The subsequent sintering process is carried out in a helium atmosphere to which 2% by volume of chlorine gas is added at a temperature of 1500° C., the green body being led through the oven at a speed of 10 mm/min. A transparent, straight glass tube having an outside diameter of 24 mm and a wall thickness of 4 mm was obtained, said tube containing impurities, in particular water and transition metals, in a quantity <50 ppb. The glass body had a density of 2.20 g/cm$^3$ and a refractive index $n_D = 1.4591$, and it was free from bubbles and reams.

In the above-described example polyvinyl alcohol was used as a binder for the extrusion mass; in order to gel this binder the extruded green body was cooled in nitrobenzene of 8° C.

EXAMPLE II

It is also possible, however, to use a binder which is gelled by heating it to a temperature higher than room temperature; such a binder is, for example, methyl cellulose. An extrusion mass having methyl cellulose as a binder had the following composition: 58% by weight of $SiO_2$ particles having an average grain diameter of 40 nm, 4% by weight of methyl cellulose and 38% by weight of water as a dispersing liquid. In this case the green body is extruded into a liquid 15 in the form of nitrobenzene having a density of 1.19 g/cm$^3$ and a temperature of 80° C., which is contained in the transfer vessel 13. The other process parameters for the manufacture of a bubble- and ream-free quartz-glass tube are in accordance with the ones described with respect to Example I.

We claim:

1. A method of manufacturing glass bodies, in which the starting material for the glass body, being an extrusion mass consisting of microdispersed $SiO_2$ particles, a binder and a dispersing liquid, is used to form a porous green body by extrusion, wherein the extrusion mass is extruded into a transfer vessel in which the extruded green body is tempered towards the gelification point of the binder present in the extrusion mass, the transfer vessel containing a liquid which is immiscible or substantially immiscible with the dispersing liquid present in the extrusion mass, and which cannot be mixed with the binder present in the extrusion mass.

2. A method as claimed in claim 1, wherein the extrusion mass comprises $SiO_2$ particles having a diameter in the range from 10 to 500 nm, and having an average diameter of 40 nm.

3. A method as claimed in claims 1 or 2, wherein the extrusion mass has a solid to dispersing liquid/binder weight ratio from 1:0.4 to 1:0.8.

4. A method as claimed in claim 1, wherein the dispersing liquid is water.

5. A method as claimed in claim 1, wherein the binder for the extrusion mass is methyl cellulose.

6. A method as claimed in claim 1, wherein the binder for the extrusion mass is polyvinyl alcohol.

7. A method as claimed in claim 1, wherein the liquid contained in the transfer vessel has substantially the same density as the extruded, still moist green body.

8. A method as claimed in claim 1, wherein the extrusion mass a mass is used which comprises $SiO_2$ particles having an average diameter of 40 nm in a quantity of 63% by weight, water as a dispersing liquid in a quantity of 32.8% by weight, and polyvinyl alcohol as a binder in a quantity of 4.2% by weight.

9. A method as claimed in claim 8, wherein the extrusion mass is extruded into the transfer vessel which contains nitrobenzene having a density of 1.19 g/cm$^3$ and a temperature of 8° C.

10. A method as claimed in claim 1, wherein the extrusion mass comprises $SiO_2$ particles having an average diameter of 40 nm in a quantity of 58% by weight, water as a dispersing liquid in a quantity of 38% by weight, and methyl cellulose as a binder in a quantity of 4% by weight.

11. A method as claimed in claim 10, wherein the extrusion mass is extruded into the transfer vessel which contains nitrobenzene having a density of 1.19 g/cm$^3$ and a temperature of 80° C.

12. A method as claimed in claim 8, wherein the extrusion is cut off between the nozzle of the extruder and the transfer vessel when it has reached the desired length, after which it is left in the transfer vessel until the gelatification process of the binder present in the extrusion mass has been concluded and the extruded green body is thereafter removed from the transfer vessel and dried.

13. A method for manufacturing glass bodies which comprises the steps of:
   (1) providing an extruder;
   (2) providing an extrusion mass comprising microdispersed $SiO_2$ particles, a binder and a dispersing liquid;
   (3) providing a transfer vessel containing a liquid that is immiscible or substantially immiscible with the dispersing liquid and which cannot be mixed with the binder present in the extrusion mass;
   (4) extruding said extrusion mass in said extruder to form a green body;
   (5) immersing said extruded green body in said transfer vessel containing said liquid; and
   (6) tempering said green body in said liquid to effect gelation of the binder.

14. A method as claimed in claim 13 wherein said binder is polyvinyl alcohol and the dispersing agent is water.

15. A method as claimed in claim 14 wherein immiscible liquid is nitrobenzene.

16. A method as claimed in claim 15 wherein said green body is tempered by cooling said liquid in said transfer vessel to a temperature below room temperature.

17. A method as claimed in claim 13 wherein said binder is methyl cellulose and said dispersing agent is water.

18. A method as claimed in claim 17 wherein the immiscible liquid is nitrobenzene.

19. A method as claimed in claim 18 wherein said green body is tempered by heating said liquid to a temperature above room temperature.

* * * * *